United States Patent [19]
Chiang

[11] Patent Number: 5,244,558
[45] Date of Patent: Sep. 14, 1993

[54] APPARATUS FOR GENERATING A MIXTURE OF HYDROGEN AND OXYGEN FOR PRODUCING A HOT FLAME

[76] Inventor: Huang C. Chiang, P.O. Box 82-144, Taipei, Taiwan

[21] Appl. No.: 950,030

[22] Filed: Sep. 24, 1992

[51] Int. Cl.$^5$ .............................................. C25B 9/00
[52] U.S. Cl. ................................... 204/241; 204/271; 204/278
[58] Field of Search ............... 204/129, 278, 275–277, 204/271, 241, 270

[56] References Cited

U.S. PATENT DOCUMENTS

| | | | |
|---|---|---|---|
| 1,273,050 | 7/1918 | Euler | 204/278 X |
| 1,582,398 | 4/1926 | Hausmeister | 204/278 |
| 1,632,285 | 6/1927 | Georgi | 204/278 |
| 3,262,872 | 7/1966 | Rhodes et al. | 204/129 X |
| 4,014,777 | 3/1977 | Brown | 204/270 |
| 4,184,931 | 1/1980 | Inoue | 204/129 |
| 4,379,043 | 4/1983 | Chappelle | 204/278 X |
| 4,747,925 | 5/1988 | Hasebe et al. | 204/278 X |
| 5,082,544 | 1/1992 | Willey et al. | 204/278 X |

Primary Examiner—Donald R. Valentine
Attorney, Agent, or Firm—Alfred Lei

[57] ABSTRACT

This invention relates to an apparatus for generating a mixture of hydrogen and oxygen for producing a hot flame and in particular to one including a housing, an electrolytic chamber fixedly mounted within the housing and having two electrodes extending out of the electrolytic chamber to connect with a rectifier, a first safety device connected with an outlet of the electrolytic chamber, a control valve connected with an outlet of the first safety device, a dryer connected with an outlet of the first safety device, and a second safety device connected with an outlet of the dryer and having a chamber in which are mounted a spring-loaded ball which will open an outlet of the second safety device when the pressure of hydrogen and oxygen in the electrolytic chamber exceeds a predetermined value.

6 Claims, 4 Drawing Sheets

APPARATUS FOR GENERATING A MIXTURE OF HYDROGEN AND OXYGEN FOR PRODUCING A HOT FLAME

BACKGROUND OF THE INVENTION

It has been found that the conventional oxyacetylene torch mixes and burns oxygen and acetylene to produce a hot flame. The acetylene is usually prepared commercially by the reaction of calcium carbide and water while oxygen is prepared by the electrolysis of water. However, the production apparatus for preparing acetylene and oxygen is very expensive and the acetylene and oxygen are stored in high pressure tanks thereby increasing the cost thereof. Further, the conventional oxyacetylene torch is dangerous in case of backfire.

Therefore, it is an object of the present invention to provide an apparatus for generating a mixture of hydrogen and oxygen for producing a hot flame which may obviate and mitigate the above-mentioned drawbacks.

SUMMARY OF THE INVENTION

This invention relates to an apparatus for generating a mixture of hydrogen and oxygen for producing a hot flame.

It is the primary object of the present invention to provide an apparatus for generating a mixture of hydrogen and oxygen for producing a hot flame which separates water into hydrogen and oxygen by electric current.

It is another object of the present invention to provide an apparatus for generating a mixture of hydrogen and oxygen for producing a hot flame which is safe in use.

It is still another object of the present invention to provide an apparatus for generating a mixture of hydrogen and oxygen for producing a hot flame which will not pollute the environment.

It is still another object of the present invention to provide an apparatus for generating a mixture of hydrogen and oxygen for producing a hot flame which is simple in construction.

It is a further object of the present invention to provide an apparatus for generating a mixture of hydrogen and oxygen for producing a hot flame which is easy to operate.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
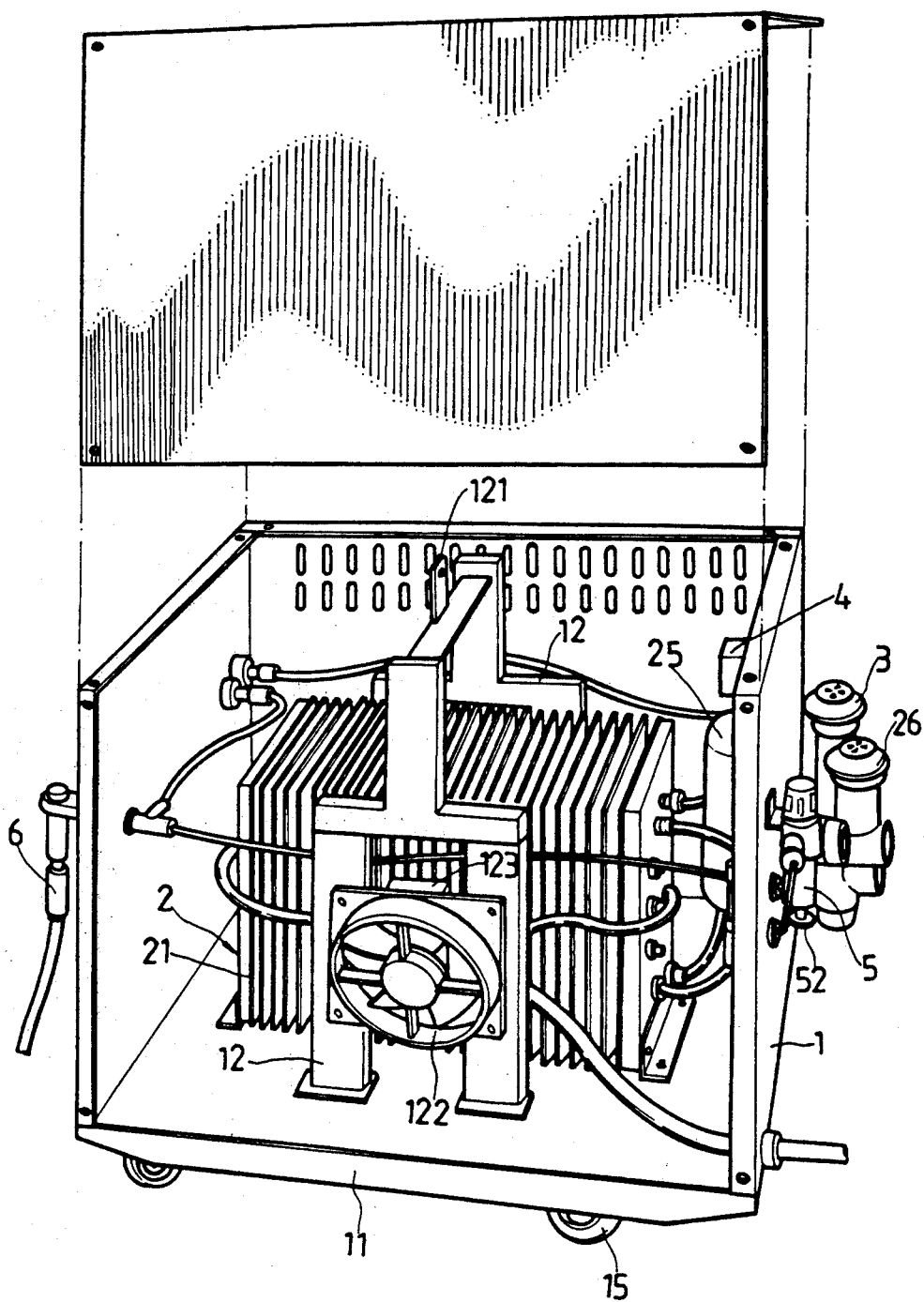
FIG. 1 is a perspective view of an apparatus for generating a mixture of hydrogen and oxygen for producing a hot flame according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
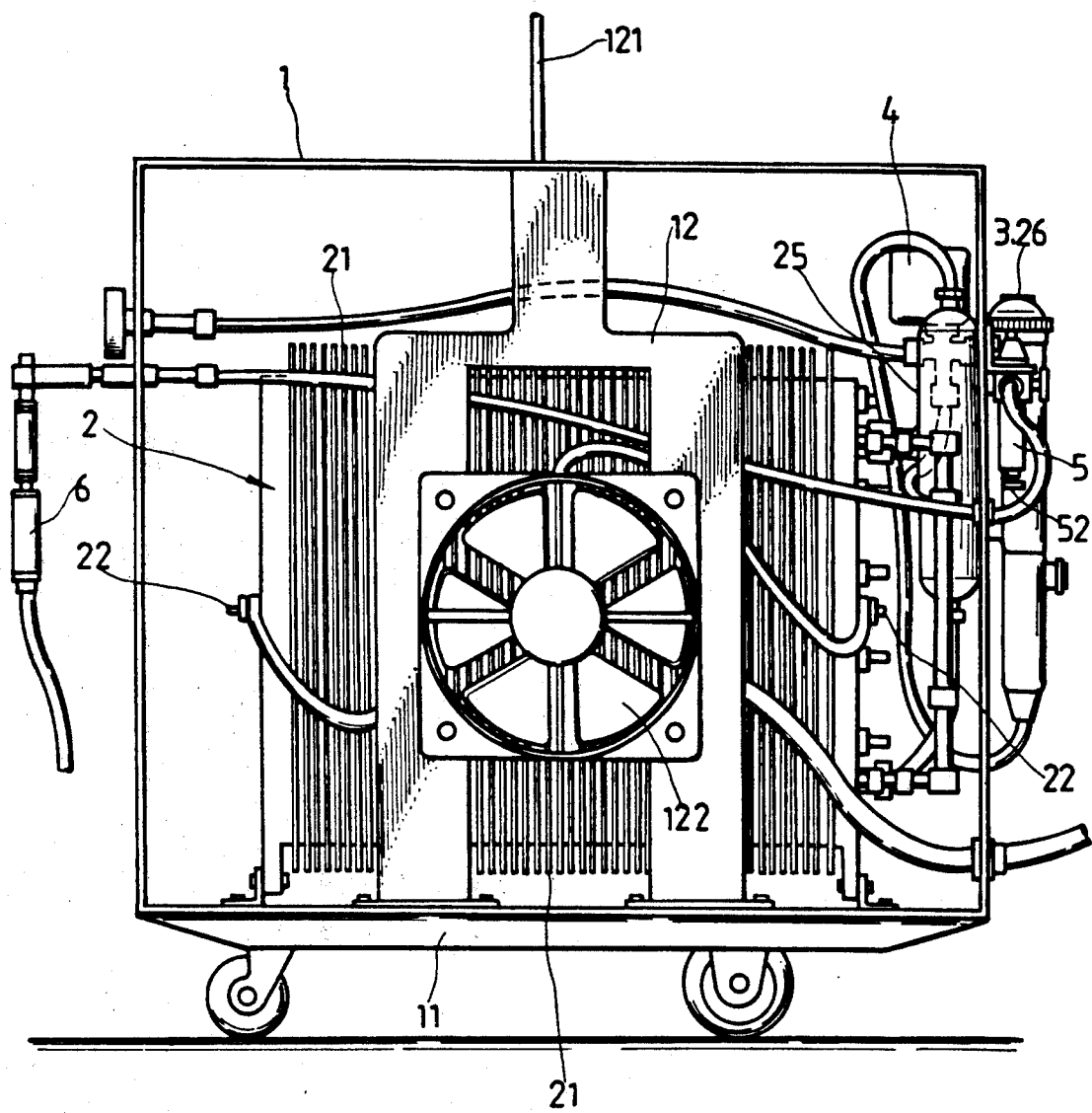
FIG. 2 is a front view of the apparatus.

With reference to the drawings and in particular to FIGS. 1 and 2 thereof, the present invention mainly comprises a housing 1, an electrolytic chamber 2, a first safety device 3, a control valve 4, a dryer 5, and a second safety device 6.

The housing 1 is provided with wheels 15 at the bottom so that it may be moved conveniently. On the inner bottom of the housing 1 are mounted two inverted U-shaped frames 12 between which there is a hook 121 for suspending the housing 1. Further, each of the inverted U-shaped frame 12 is provided with an exhaust fan 122 which is connected with a rectifier 123.

Figure 3:
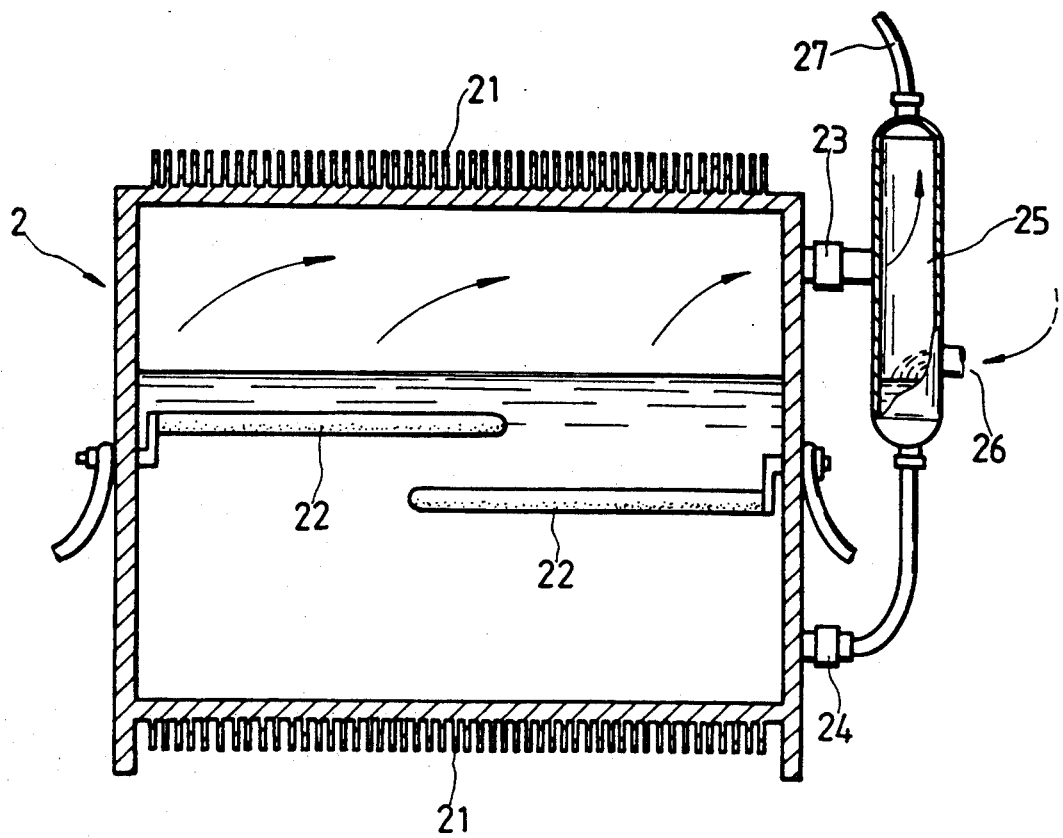
FIG. 3 is a sectional view of the electrolytic chamber.

The electrolytic chamber 2 is a closed hollow member fixedly mounted on the central portion of the bottom of the housing 1 and provided with heat dissipating fins 21 at all sides except the left and right ones (with respect to FIG. 1). In addition, the electrolytic chamber 2 is provided with two metal electrodes 22 extending out of the electrolytic chamber 2 (see FIG. 3). The two metal electrodes 22 are respectively connected with the two output ends of the rectifier 123. Further, the right side of the electrolytic chamber 2 (with respect to FIG. 3) is formed with an outlet 23 at the upper part and an inlet 24 at the lower part. The outlet 23 and the inlet 24 are connected to a tube 25. The outlet 23 is a way out for the hydrogen and oxygen generated in electrolysis while the inlet 24 is used to supplement water through an inlet 26 of the tube 25 into the electrolytic chamber 2. The water level in the electrolytic chamber 2 may be controlled by a sensor (not shown) which will send out a signal for supplementing water and cut off the power supplied to the metal electrodes 22 when the water level is below a predetermined value.

Figure 4:
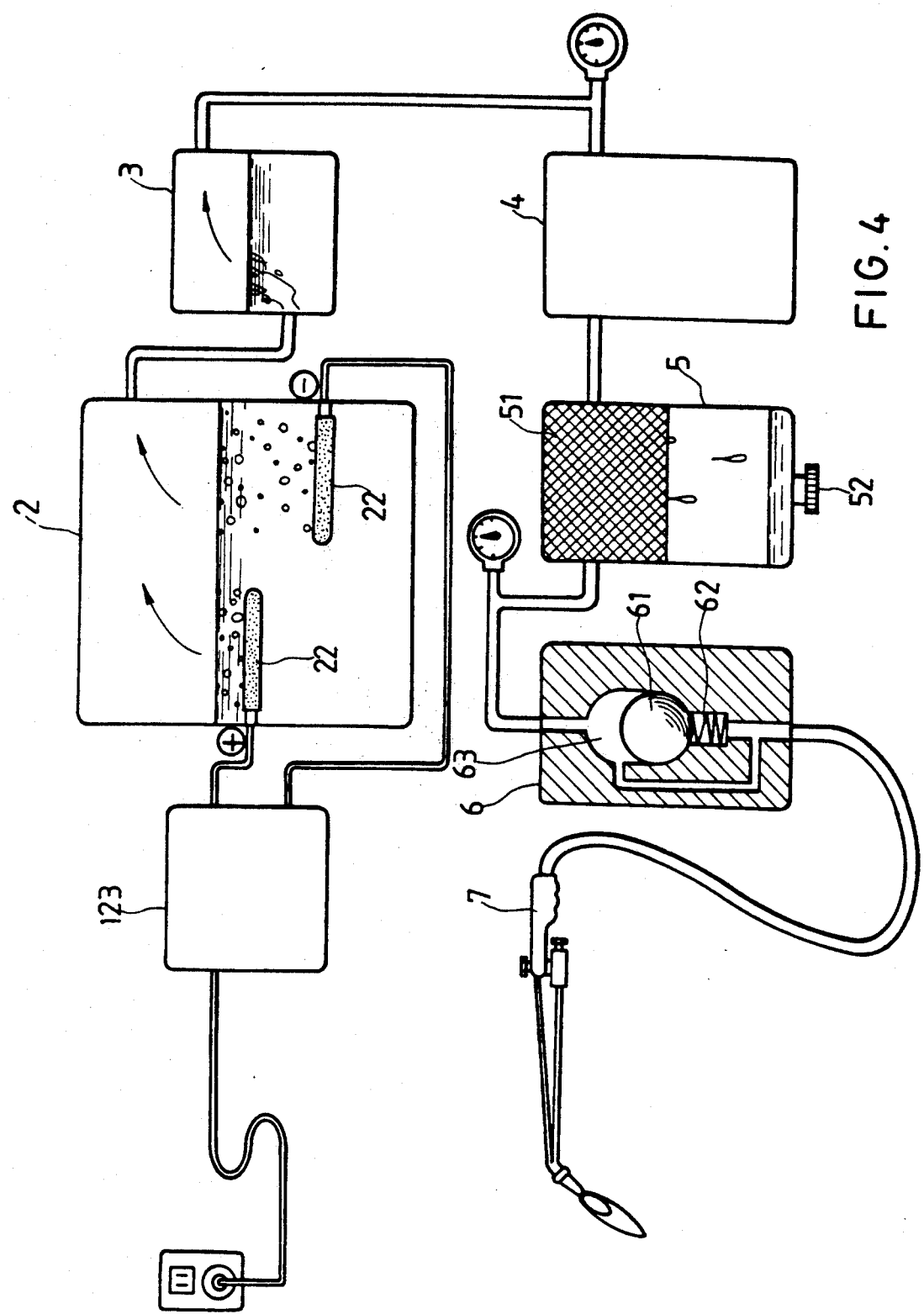
FIG. 4 is a flow diagram of the apparatus.

The first safety device 3 (see FIGS. 1 and 4) is a tubular member mounted at one side of the housing 1 and filled with water. Further, the outlet 27 of the tube 25 is connected to the lower part of the first safety device 3 so that the hydrogen and oxygen will flow through the water in the first safety device 3 before reaching the control valve 4. Hence, in case there is a backfire, it will be distinguished by the first safety device 3 thereby preventing the backfire from spreading to the electrolytic chamber 2.

The control valve 4 is connected with the outlet ofced the first safety device 3, which is designed so that when the pressure in the electrolytic chamber 2 exceeds a predetermined value, the control valve 4 will send out a signal to cut off the power supplied to the metal electrodes 22.

The dryer 5 is connected to the outlet of the control valve 4 and has a drying agent 51 at the upper portion and an outlet at the bottom. As the hydrogen and oxygen pass through the drying agent 51 of the dryer 5, the water will be absorbed by the drying agent 51. When the drying agent 51 is saturated, the water will drop down to the lower portion of the dryer 5 and may be released by opening an drain outlet 52.

The second safety device 6 is connected with the outlet of the dryer 5 at its inlet and with a torch 7 or the like at its outlet. The second safety device 6 is provided with a chamber 63 in which are mounted a ball 61 and a spring 62 urging the ball 61 to go upward. As the torch 7 is open, the hydrogen and oxygen will push the ball 61 downward and flow to the torch 7. In case of backfire, the spring 62 will urge the ball 61 to go upward to close the second safety device 6 thereby cutting off the hydrogen and oxygen supplied to the torch 7 and therefore, ensuring safety of the user.

When in use, the power is first turned on and the metal rods 22 will separate the water into hydrogen and oxygen. The hydrogen and oxygen will be stored in the electrolytic chamber 2 until the pressure exceeds a predetermined value. Then, the hydrogen and oxygen flow through the first safety device, the control valve 4 to the dryer 5 where the hydrogen and oxygen are dried by the drying agent 51. Thereafter, the dried hydrogen and oxygen flow through the second safety device 6 to the torch 7.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An apparatus for generating a mixture of hydrogen and oxygen for producing a hot flame comprising:
   a housing;
   an electrolytic chamber fixedly mounted within said housing and having two electrodes extending out of the electrolytic chamber to connect with a rectifier;
   a first safety device connected with an outlet of said electrolytic chamber, said first safety device being a tubular member mounted at one side of said housing and filled with water;
   a control valve connected with an outlet of said first safety device;
   a dryer connected with an outlet of said first safety device; and
   a second safety device connected with an outlet of said dryer and having a chamber in which are mounted a spring-loaded ball which will open an outlet of said second safety device when pressure of hydrogen and oxygen in said electrolytic chamber exceeds a predetermined value.

2. The apparatus for generating a mixture of hydrogen and oxygen for producing a hot flame as claimed in claim 1, wherein said housing is provided with wheels on the bottom thereof.

3. The apparatus for generating a mixture of hydrogen and oxygen for producing a hot flame as claimed in claim 1, wherein said housing is provided with dissipating fins on the outer surface thereof.

4. The apparatus for generating a mixture of hydrogen and oxygen for producing a hot flame as claimed in claim 1, further comprising two inverted U-shaped frames mounted on an inner bottom of said housing and each provided with an exhaust fan.

5. The apparatus for generating a mixture of hydrogen and oxygen for producing a hot flame as claimed in claim 1, further comprising a tube connected between an upper part of said electrolytic chamber and a lower part of said electrolytic chamber.

6. The apparatus for generating a mixture of hydrogen and oxygen for producing a hot flame as claimed in claim 1, wherein said dryer is provided with a drying agent at an upper portion and a drain outlet at a bottom thereof.

* * * * *